United States Patent [19]

Fujimoto et al.

[11] Patent Number: 5,703,573
[45] Date of Patent: Dec. 30, 1997

[54] TRANSMITTER-RECEIVER FOR NON-CONTACT IC CARD SYSTEM

[75] Inventors: Masahiro Fujimoto; Katsuhisa Orihara, both of Kanuma, Japan

[73] Assignee: Sony Chemicals Corp., Tokyo, Japan

[21] Appl. No.: 584,284

[22] Filed: Jan. 11, 1996

[30] Foreign Application Priority Data

Jan. 11, 1995 [JP] Japan ................... 7-019827

[51] Int. Cl.[6] .................................................. H04Q 0/00
[52] U.S. Cl. ......................... 340/825.54; 340/825.36; 342/42
[58] Field of Search ............... 340/825.54, 825.34, 340/825.72, 825.36, 825.49; 342/42, 44, 47

[56] References Cited

U.S. PATENT DOCUMENTS

| | | | |
|---|---|---|---|
| 4,384,288 | 5/1983 | Walton | 340/825.34 |
| 4,804,961 | 2/1989 | Hane | 342/42 |
| 4,851,820 | 7/1989 | Fernandez | 340/825.44 |
| 5,012,236 | 4/1991 | Troyk et al. | 340/825.54 |
| 5,084,699 | 1/1992 | De Michele | 340/825.54 |
| 5,198,807 | 3/1993 | Troyk et al. | 340/825.54 |
| 5,298,904 | 3/1994 | Olich | 342/42 |
| 5,317,309 | 5/1994 | Vercellotti et al. | 340/825.49 |
| 5,537,105 | 7/1996 | Marsh et al. | 340/825.54 |
| 5,602,535 | 2/1997 | Boyles et al. | 340/825.69 |
| 5,621,412 | 4/1997 | Sharpe et al. | 340/825.54 |

FOREIGN PATENT DOCUMENTS

| | | |
|---|---|---|
| 0 297 688 | 1/1989 | European Pat. Off. |
| 43 33 964 | 4/1995 | Germany . |
| 2 137 781 | 10/1984 | United Kingdom . |
| 2 187 916 | 9/1987 | United Kingdom . |

Primary Examiner—Michael Horabik
Assistant Examiner—Edward Merz
Attorney, Agent, or Firm—Hill, Steadman & Simpson

[57] ABSTRACT

In a non-contact IC card system which transmits and receives signals between an interrogator and a transponder, a transmitter-receiver used for the interrogator comprises a distance detecting means for detecting the distance between the interrogator and the transponder, and an output control means for controlling the output level of the interrogator in accordance with the signals detected by the distance detecting means, so as to keep the receiving level of the transponder within the range of a given value. The receiving level in the transponder can be prevented from varying depending on the distance between the interrogator and the transponder, so that it becomes unnecessary to provide a protective circuit against an excessive increase of the receiving level. The optimum threshold voltage can also be prevented from varying.

2 Claims, 3 Drawing Sheets

INTERROGATOR

TRANSPONDER

5,703,573

TRANSMITTER-RECEIVER FOR NON-CONTACT IC CARD SYSTEM

BACKGROUND OF THE INVENTION

1. Field of the Invention

This invention relates to a non-contact integrated circuit (hereinafter "IC") card system which transmits and receives signals between an interrogator (a reader-writer) and a transponder (a card), in particular, to a transmitter-receiver used for the interrogator.

2. Description of the Related Art

As one of relatively short-distance communication systems, non-contact IC card systems are well known which transmit and receive signals between an interrogator (a reader-writer) and a transponder (a card) by the electromagnetic coupling method or electromagnetic induction method.

FIG. 2 is a block diagram commonly used in such an electromagnetic coupling type non-contact IC card system. In the non-contact IC card system shown in FIG. 2, the interrogator modulates a carrier wave generated in an OSC (oscillator) 1, through a modulating circuit 3 in accordance with signals from a data-processing circuit 2, and the modulated wave is amplified in a constant-current driver circuit 4 and then transmitted to the transponder through an antenna coil 5. The transponder receives signals from the interrogator through a tuning resonant circuit comprised of an antenna coil 11 and a capacitor 12, whereupon the received signals are demodulated in a demodulating circuit 13 and are sent to a data-processing circuit 14. The data are processed in the data-processing circuit 14, and the preset data are sent to a modulating circuit 15 and then sent out to the interrogator through an antenna 11. The interrogator receives the signals sent from the transponder through the antenna coil 5, whereupon the signals are demodulated in a demodulating circuit 6 and then sent to the data-processing circuit 2 to process the data to make judgement or the like.

Now, in general, the electric or magnetic field intensity emitted from the antenna in such a communication system decreases in inverse proportion to the cube of the distance from the antenna. More specifically, in the case of a dipole antenna, the electric filed intensity emitted therefrom decreases in inverse proportion to the cube of the distance from the antenna. In the case of a loop antenna, the magnetic filed intensity emitted therefrom decreases in inverse proportion to the cube of the distance from the antenna. Accordingly, in order to make the communication distance longer, the receiving efficiency of the transponder is required to be set higher with respect to a constant signal output of the interrogator.

However, when a transponder whose receiving efficiency has been set higher is held very close to the interrogator for example, when the card as a transponder is held close to the interrogator, the transponder receives an excessive signal or power to cause damage of the circuit in the transponder in some cases. Accordingly, to cope with this problem, it is common to provide an additional circuit such as a protective circuit 16 as shown in FIG. 3, which sets the upper limit of a receiving level, or a level shift circuit.

Since, however, additional parts are required in order to provide the protective circuit or the level shift circuit, there are problems such that the transponder can not be made compact, the production cost increases and the frequency response may deteriorate.

Even when the protective circuit or the level shift circuit are provided, the receiving level of the transponder varies depending on the distance between the interrogator and the transponder. Hence, in the case when the non-contact IC card system employs an ASK (amplitude shift keying) modulation system, not only signal level $L_s$ but also noise level $L_n$ becomes higher as the distance between the both locations becomes shorter. Thus, so long as a threshold value (threshold voltage) at which a signal level is discriminated from a noise level is kept constant, the bit error rate tends to become higher. Namely, the ASK modulation type non-contact IC card system has the problem that an optimum threshold voltage varies depending on the distance between the interrogator and the transponder. To cope with this problem, one may contemplate that the threshold voltage may be made variable. It, however, is difficult to optimally change the threshold voltage in accordance with the distance between the interrogator and the transponder.

SUMMARY OF THE INVENTION

This invention settles the problems in the prior art as discussed above. An object of the present invention is to make the transponder's receiving level constant without dependence on the distance between the interrogator and the transponder, to thereby make it unnecessary to provide the additional circuit such as the protective circuit, and make the optimum threshold voltage stable to lower the bit error rate.

The present inventors have discovered that the receiving level of the transponder can be kept constant by providing the interrogator with the function to detect the distance between the interrogator and the transponder and controlling the interrogator's output level in accordance with the distance thus detected. They have thus accomplished the present invention.

This invention provides a transmitter-receiver used for an interrogator in a non-contact IC card system which transmits and receives signals between the interrogator and a transponder; the transmitter-receiver comprising;

a distance detecting means for detecting the distance between the interrogator and the transponder; and an output control means for controlling the output level of the interrogator in accordance with the signals detected by the distance detecting means, so as to keep the receiving level of the transponder within the range of a given value.

In the interrogator comprising the transmitter-receiver of the present invention, the distance detecting means detects the distance between the interrogator and the transponder, and the output control means controls the antenna output level of the interrogator in accordance with the results detected by the distance detecting means, so as to keep the receiving level (signal level or receiving power level) of the transponder within the range of a given value. Hence, the receiving level of the transponder is kept substantially constant without dependence on the distance between the interrogator and the transponder. Thus, it could become unnecessary to provide the transponder with the protective circuit against the excessive increase of receiving level in the transponder, caused by a too short distance between the interrogator and the transponder. Accordingly, it becomes possible to make the circuit of the transponder simpler.

Since the receiving level in the transponder is substantially constant without dependence on the distance between the interrogator and the transponder, the optimum threshold voltage for distinguishing signals from noise in the transponder is also substantially constant. Thus, the bit error rate involved in the transmission and reception of signals can be made greatly smaller and the communication can be made stabler.

DETAILED DESCRIPTION OF THE INVENTION

The present invention will be specifically described below by giving a preferred embodiment.

Figure 1:
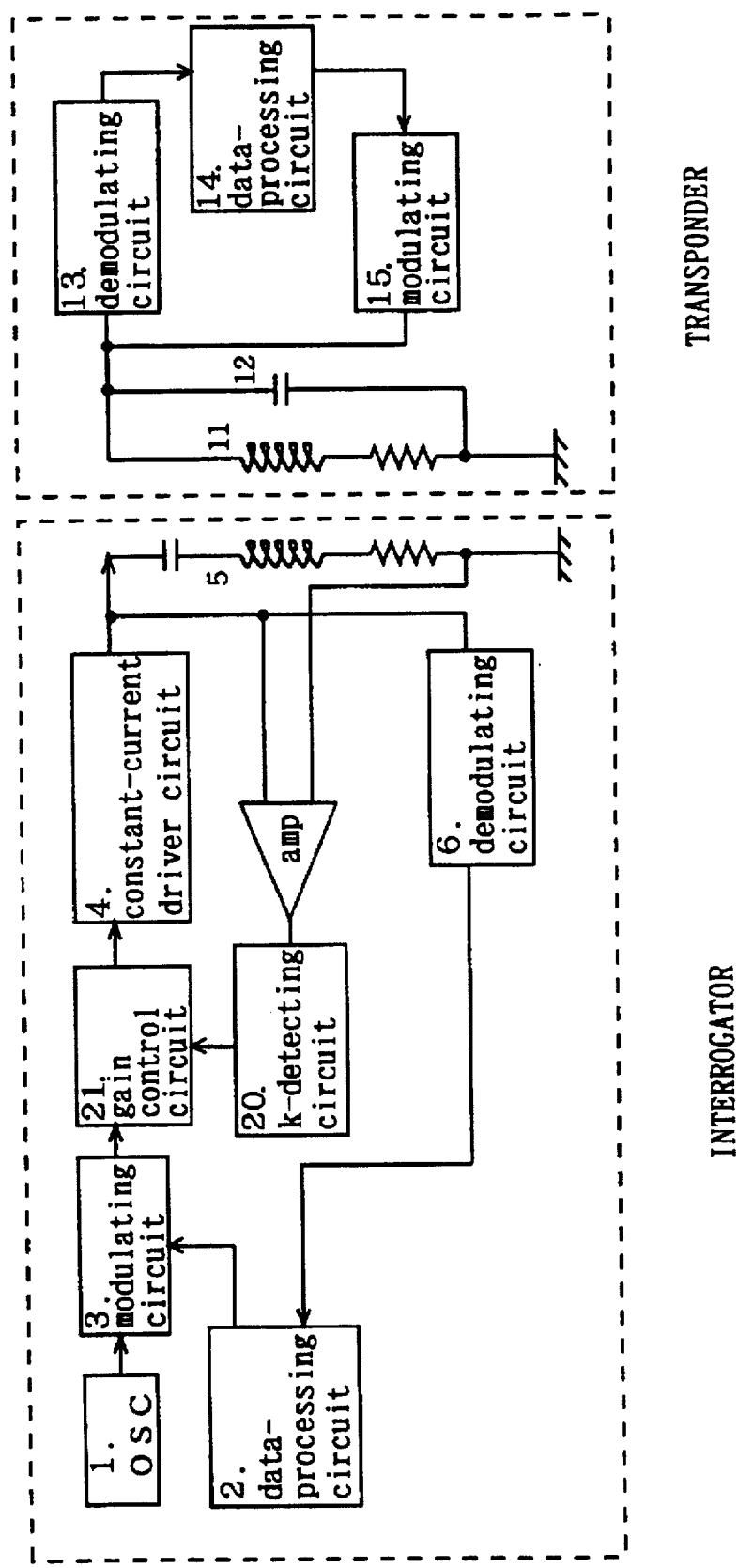
FIG. 1 is a block diagram of a non-contact IC card system employing as the interrogator a device according to an embodiment of the present invention.
Figure 2:
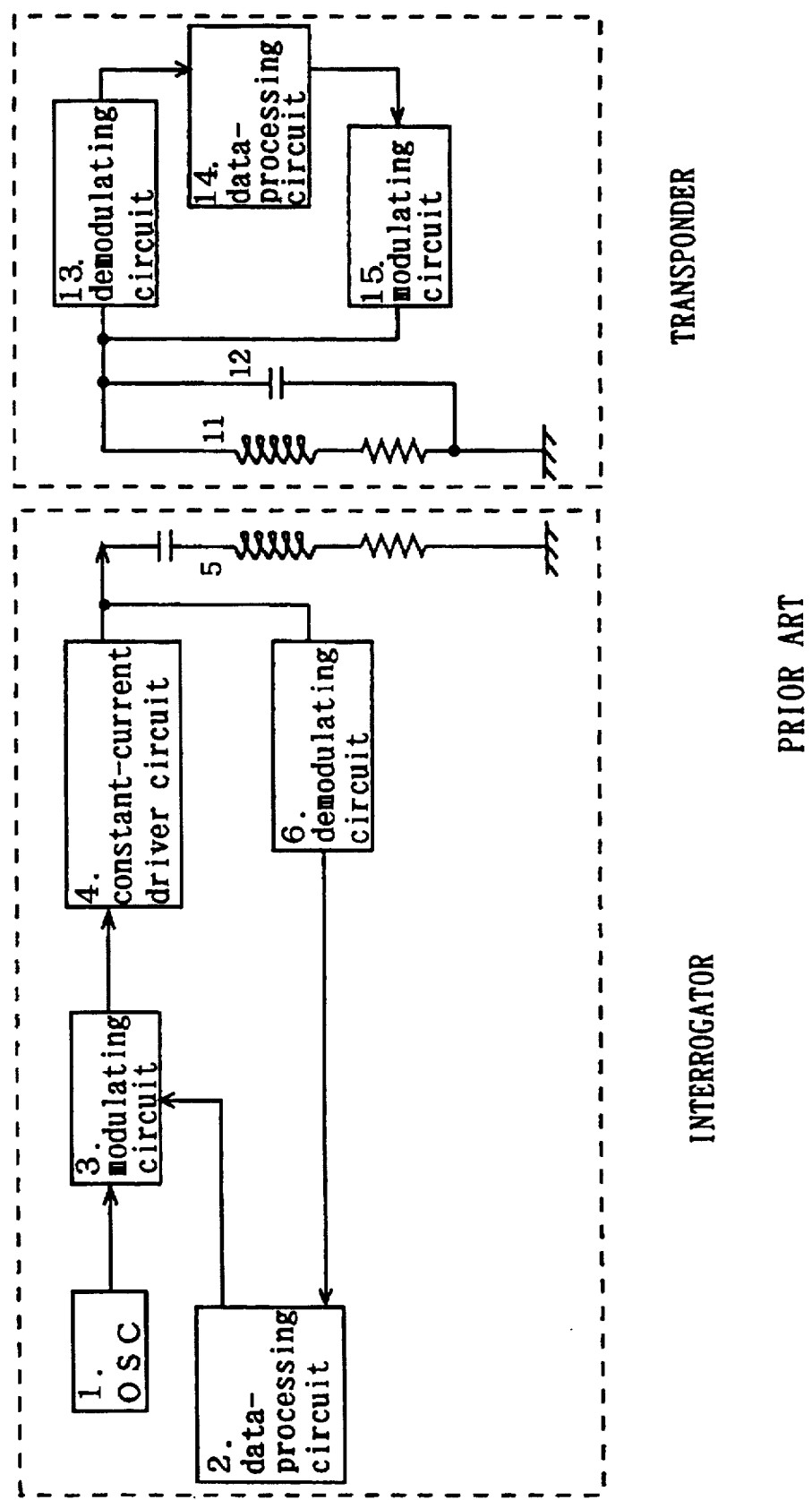
FIG. 2 is a block diagram of a conventional non-contact IC card system.
Figure 3:
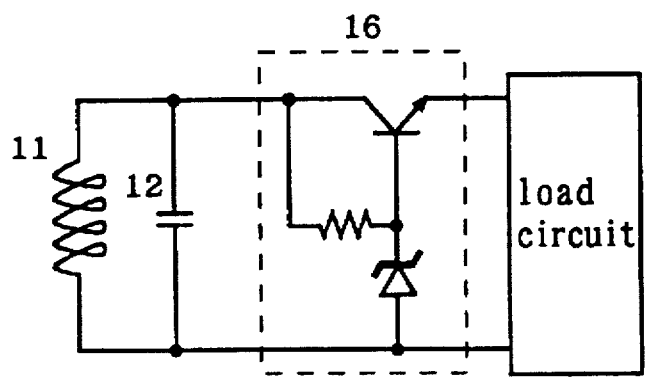
FIG. 3 illustrates a protective circuit provided in a transponder.
Figure 4:
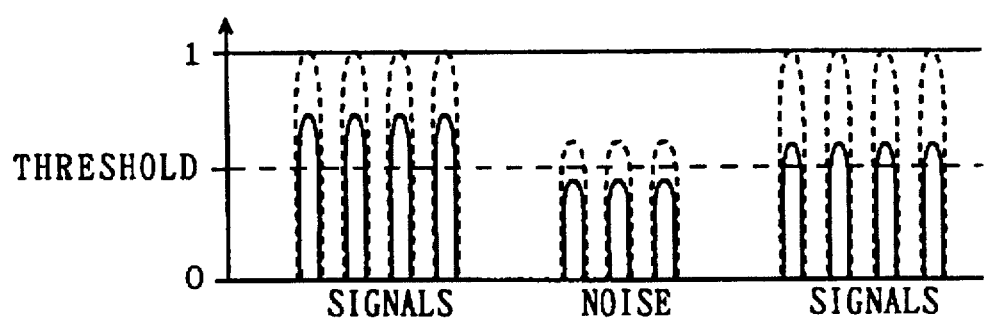
FIG. 4 shows the relationship between signal level $L_s$, noise level $L_n$ and threshold voltage.

FIG. 1 is a block diagram of a non-contact IC card system in which an interrogator comprising the device according to an embodiment of the present invention is set up in combination with the same conventional transponder as that shown in FIG. 2.

Like the interrogator as shown in FIG. 2, the interrogator shown in FIG. 1 has a data-processing circuit 2, a modulating circuit 3, a constant-current driver circuit 4, an antenna coil 5, and a demodulating circuit 6. The signals from the data-processing circuit 2 modulate a carrier wave in the modulating circuit 3, and the modulated wave is amplified in the constant-current driver circuit 4 and then transmitted to the transponder through the antenna coil 5. The signals received from the transponder are demodulated in the demodulating circuit 6 and are sent to the data-processing circuit 2 to process the data to make judgement or the like. These are common to the conventional one.

However, the interrogator shown in FIG. 1 is different in that it is provided with an antenna coupling coefficient detecting circuit (hereinafter "k-detecting circuit") 20 as the distance detecting means for detecting the distance between the interrogator and the transponder and also provided with, e.g., a gain control circuit 21 as the output control means for controlling the output level of the interrogator in accordance with the signals detected by the k-detecting circuit.

In the interrogator shown in FIG. 1, the k-detecting circuit 20 is a circuit in which an antenna coupling coefficient k indicating the degree of coupling between the antenna 5 of the interrogator and an antenna 11 of the transponder is detected in accordance with the voltage generated between terminals of the antenna 5 of the interrogator. More specifically, the antenna coupling coefficient k varies depending on the distance between the interrogator and the transponder and affects an impedance z viewed from the interrogator, as shown by the following formula.

$$z = r_0 (1 + k^2 Q_1 Q_2)$$

Therefore, the voltage drop occurring when the antenna 5 of the interrogator is driven at a constant current $i_s$ is as follows:

$$V_s = i_s r_0 (1 + k^2 Q_1 Q_2)$$

In the formula, letter symbols represent the following:

$V_s$: Voltage generated between antenna terminals of the interrogator $i_s$: Antenna drive current of the interrogator $r_0$: Antenna residual resistance of the interrogator $k$: Antenna coupling coefficient $Q_1$: Q (quality factor) of the antenna of the interrogator $Q_2$: Q (quality factor) of the antenna of the transponder Here, the antenna drive current $i_s$ of the interrogator and the antenna residual resistance $r_0$ of the interrogator is constant without dependence on the distance between the interrogator and the transponder. The Q's ($Q_1$ and $Q_2$) of the respective antennas of the interrogator and transponder are each a value specific to the antenna of the interrogator or transponder. Therefore, the voltage $V_s$ generated between antenna terminals of the interrogator can be determined to thereby determine the antenna coupling coefficient k according to the formula:

$$k = \left( \frac{V_s - i_s r_0}{i_s r_0 Q_1 Q_2} \right)^{1/2}$$

Meanwhile, the gain control circuit 21 shown in FIG. 1 is a circuit that controls the output gain of the interrogator so as to be proportional to a reciprocal of the antenna coupling coefficient k thus determined.

Hence, according to the interrogator shown in FIG. 1, the output from the interrogator is controlled in accordance with the distance between the interrogator and the transponder, so that it becomes possible for the transponder to maintain a constant receiving level.

In the foregoing, one embodiment of the present invention has been described with reference to the drawings. Besides this embodiment, the present invention may take various modes. For example, in the interrogator shown in FIG. 1, in which the k-detecting circuit that detects the antenna coupling coefficient k is provided as the distance detecting means and the gain control circuit 21 that controls the gain correspondingly to a reciprocal of the antenna coupling coefficient k is provided as the output control means of the interrogator, the distance detecting means and the output control means are by no means limited to these. A characteristic value variable depending on the distance between the interrogator and the transponder, as exemplified by a mutual inductance, may be detected to control the output level of the interrogator in accordance with the results thus detected.

The present invention can also be widely applied in interrogators of electromagnetic coupling type or electromagnetic induction type non-contact IC card systems. Thus, while an example in which the antenna is fed through the constant-current driver circuit is given in the embodiment described above, the present invention can also be applied in an instance where the antenna is fed through a constant-voltage driver circuit.

As described above in detail, the present invention makes it possible to make the interrogator's receiving level constant without dependence on the distance between the interrogator and the transponder. Thus, it becomes unnecessary to provide the transponder with the additional circuit such as the protective circuit against the excessive increase of receiving level in the transponder, caused when the interrogator and the transponder stand too close to each other. Accordingly, it becomes possible to make the transponder compact.

In the case when the non-contact IC card system employs the ASK modulation system, the optimum threshold voltage in the transponder does not vary depending on the distance between the interrogator and the transponder. Hence, the bit error rate involved in the transmission and reception of signals by no means increases, and the communication can be stably performed.

We claim:

1. A transmitter-receiver used for an interrogator in a non-contact IC card system which transmits and receives signals between the interrogator and a transponder; said transmitter-receiver comprising;

a distance detecting means for detecting the distance between the interrogator and the transponder; and an output control means for controlling the output level of the interrogator in accordance with the signals detected by the distance detecting means, so as to keep the receiving level of the transponder within the range of a given value.

2. The transmitter-receiver for a non-contact IC card system according to claim 1, wherein said distance detecting means detects an antenna coupling coefficient between the interrogator and the transponder, and the output control means controls the output level in accordance with a reciprocal of the antenna coupling coefficient detected by said distance detecting means.

* * * * *